Jan. 22, 1924.
C. F. JENKINS
HIGH SPEED CAMERA
Filed April 14, 1921
1,481,288
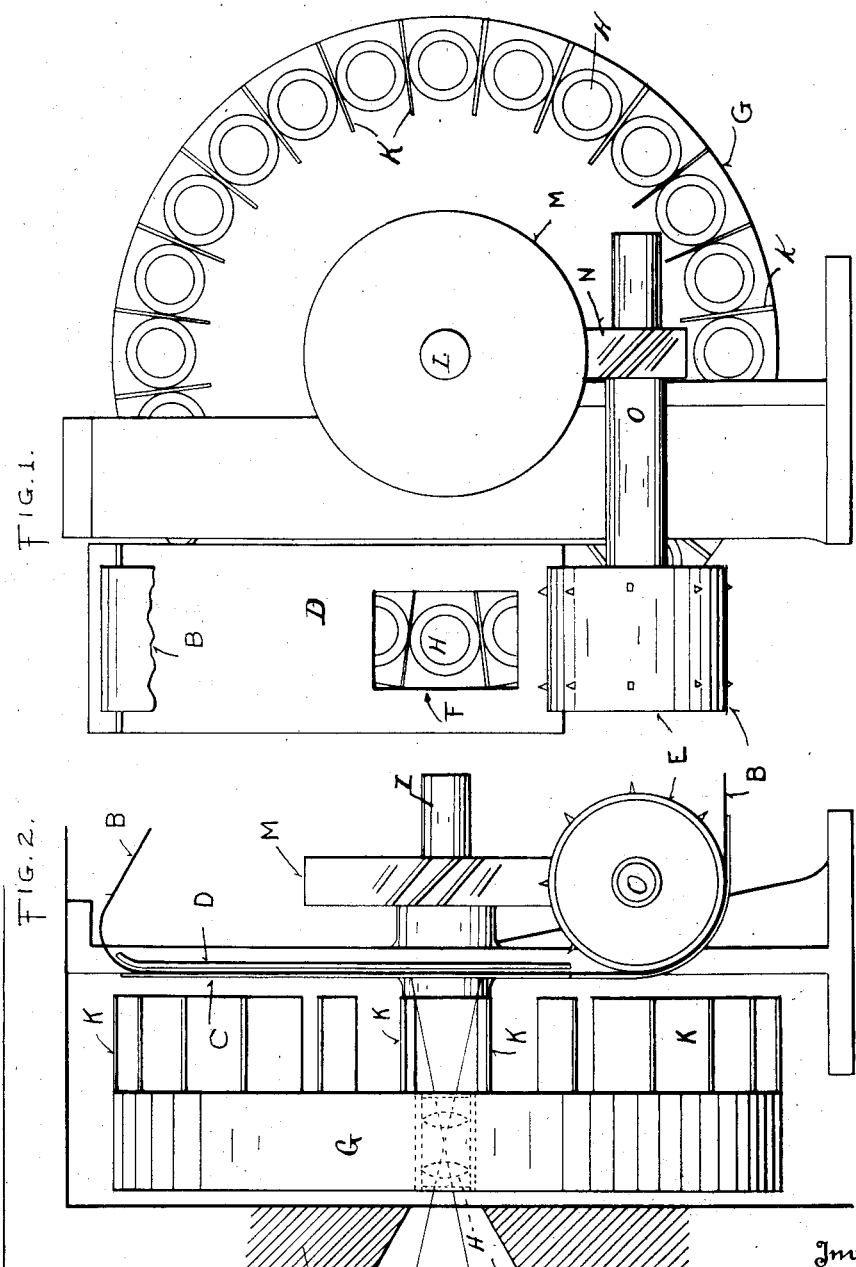

Patented Jan. 22, 1924.

1,481,288

UNITED STATES PATENT OFFICE.

CHARLES FRANCIS JENKINS, OF WASHINGTON, DISTRICT OF COLUMBIA.

HIGH-SPEED CAMERA.

Application filed April 14, 1921. Serial No. 461,427. REISSUED

*To all whom it may concern:*

Be it known that I, CHARLES FRANCIS JENKINS, a citizen of the United States, and resident of Washington, in the District of Columbia, have invented certain new and useful Improvements in High-Speed Cameras, of which the following is a specification, reference being had therein to the accompanying drawing.

The object of this invention is to provide devices for producing motion pictures at a rate many times that until recently considered possible, a rate of 2000 a second having been attained. This rate renders possible analysis of the movement of a body at such high speed that its positions could not heretofore be recorded at desirably short intervals.

The camera of Patent Number 560,800 was provided with a plurality of lenses successively passing an exposure aperture at nearly the rate of a constantly moving sensitized film passing the same aperture, but that camera could not compete commercially with a camera having a single lens and intermittently-moving film. Intermittent motion is satisfactory at 16 exposures per second, but obviously is not available for a hundred times that speed. With multiple, uniform-speed lenses, the limit of speed depends only upon sensitiveness of film, intensity of light, and rapidity of the lenses. In such high speed work, camera cost is of little importance in comparison with the value of extremely short picture intervals. The lenses should work with their greatest aperture and the exposure opening should be wider than in ordinary cameras so as to increase the exposure interval. Provision must be made for preventing overlapping of lens images upon the film, but devices heretofore proposed for such ends have not proved successful at such extreme speeds as are being here considered. Extended experiments have resulted in successfully using a sort of mask between the lenses and the exposure opening.

In the accompanying diagrammatic drawings,

Fig. 1 shows my devices in front elevation.

Fig. 2 shows the same devices in side elevation, a portion of the camera box being shown.

In these views, B represents a sensitized film constantly drawn down between plates C, D, and past exposure openings at F by a sprocket drum E, the height of the opening being approximately equal to twice the vertical width of a picture. In front of the plates C, D, is a rotary lens carrier G, having in its peripheral zone a series of identically similar lenses H, and carried by a shaft I.

Between successive lenses, partitions K are fixed to the carrier and project nearly across the space between the latter and the plate C, so that light rays S, T, entering the box L at the aperture J and passing through each lens H arriving at the aperture and thence to the film, cover on the latter no more than a picture's height, while rays which would strike the film at higher or lower points are intercepted by the partitions K. The carrier shaft I bears a gear M which meshes with a pinion N upon the shaft O of the sprocket drum, so that the film and the lenses have, at the exposure point, precisely the same speed. The shafts may be rotated at any desired speed by suitable devices, not shown.

Obviously, the disk carrier, its lenses and its radial partitions form a unitary structure, and necessarily move together as if integral. Obviously, too, the gears M, N, being, as shown, of a well-known type without "backlash," the film and lens-directed light beams move exactly together, as they must to give satisfactory pictures at the extremely high speed mentioned.

What I claim is:—

1. The combination with a camera casing having a light aperture and film feeding devices, of a disk carrier having fixed in its peripheral zone an annular series of duplicate, closely adjacent lenses in position to pass said aperture successively, radial partitions fixed to the carrier, separating each lens from its neighbors and extending substantially to the film, and means for moving the lenses and film at identical speeds across the path of light from said aperture, said carrier, lenses, and partitions moving as if integral.

2. In a camera for producing hundreds of motion pictures per second, the combination with a plate having an exposure opening, of means for continually feeding a sensitized film past said opening, a rigid member rotating in front of said plate and having fixed in its peripheral zone a plurality of lenses arranged to pass said opening at the film's rate while focusing substantially at said opening, and approximately rigid, opaque partitions projecting respectively from said member between each lens and the next succeeding lens, and reaching nearly to said plate.

In testimony whereof I hereunto affix my signature.

CHARLES FRANCIS JENKINS.